US012684068B2

(12) United States Patent
Shetty et al.

(10) Patent No.: US 12,684,068 B2
(45) Date of Patent: Jul. 14, 2026

(54) SYSTEM AND METHOD TO DETERMINE AND REMEDIATE REVERSE TRANSITION FROM DIGITAL CHANNELS IN A CONTACT CENTER

(71) Applicant: Nice Ltd., Ra'anana (IL)

(72) Inventors: Sanketh Sudhakar Shetty, Pune (IN); Salil Dhawan, Kharadi Pune (IN); Pramod Jalindar Giri, Pune (IN)

(73) Assignee: Nice Ltd. (IL)

( * ) Notice: Subject to any disclaimer, the term of this patent is extended or adjusted under 35 U.S.C. 154(b) by 132 days.

(21) Appl. No.: 18/456,848

(22) Filed: Aug. 28, 2023

(65) Prior Publication Data

US 2025/0080651 A1     Mar. 6, 2025

(51) Int. Cl.
| | |
|---|---|
| *H04M 3/51* | (2006.01) |
| *H04M 3/523* | (2006.01) |
| *G10L 15/08* | (2006.01) |
| *G10L 15/18* | (2013.01) |

(52) U.S. Cl.
CPC ....... *H04M 3/5141* (2013.01); *H04M 3/5183* (2013.01); *H04M 3/5235* (2013.01); *G10L 2015/088* (2013.01); *G10L 15/1815* (2013.01)

(58) Field of Classification Search
CPC ............. H04M 3/5141; H04M 3/5183; H04M 3/5235; H04M 3/5175
USPC ......................... 379/243, 242, 272, 273, 271
See application file for complete search history.

(56) References Cited

U.S. PATENT DOCUMENTS

| | | | |
|---|---|---|---|
| 2022/0103684 A1* | 3/2022 | Chavez | ............... H04M 3/5166 |
| 2024/0422264 A1* | 12/2024 | Pandey | ............... H04M 3/5175 |

* cited by examiner

*Primary Examiner* — Thjuan K Addy

(57) ABSTRACT
A system and a method for managing interactions between agent devices and customer devices, the system comprising: a computing device; a local storage; a memory; and a processor, the processor configured to: identify interaction data in interactions between an agent device and a customer device that show a transition from a first connection type to a second connection type; and when a transition in connection types is identified, initiating one or more remedial measures.

20 Claims, 13 Drawing Sheets

200

<u>300</u>

IDENTIFYING  INTERACTION METADATA IN INTERACTIONS BETWEEN AN AGENT DEVICE AND A CUSTOMER DEVICE THAT SHOW  A TRANSITION FROM A FIRST CONNECTION TYPE TO A SECOND CONNECTION TYPE.          302

WHEN A TRANSITION IN CONNECTION  TYPES IS IDENTIFIED, INITIATING ONE OR MORE REMEDIAL MEASURES.          304

Supervisor Realtime Dashboard

Average Interaction Time

Today: 10 seconds
Yesterday: 12 seconds

Agents in Queue

On call: Agent X
Wrapping Up: Agent Y
Idle: Agent Z

Average Answer Speed

Today: 10 seconds
Yesterday: 12 seconds

Queue Interactions

Unattended: 50
Attended: 150
Current interactions: 200

Agent Overview

On call
Idle
Wrapping up

Drift Risk Interactions

75

SYSTEM AND METHOD TO DETERMINE AND REMEDIATE REVERSE TRANSITION FROM DIGITAL CHANNELS IN A CONTACT CENTER

TECHNICAL FIELD OF THE INVENTION

The present invention relates generally to managing of interactions, more specifically to the identification of changes to the connection type between a plurality of devices.

BACKGROUND OF THE INVENTION

Interactions between customers and agents of contact centers, may no longer be limited to connections via traditional voice channels such as phone calls. Instead, customers can engage with contact centers across multiple channels such as online web chats, mobile voice calls, video chats and social media channels.

Communication between agents and customers via internet services, e.g. using digital channels such as online web chats, may allow contact centers to provide services via digital channels in line with increasing customer demand. Digital channels may provide seamless customer experience and improve the overall efficiency of contact centers.

Whilst communication between agents and customers via traditional voice channels represents the majority of contact attempts by customers, research shows that the percentage of customer interactions with contact centers via phone calls has dropped from 90.1% down to 73.2% between 2006 and 2013. Meanwhile, other digital communication channels that use communication via text-based chat messages facilitated via e-mail, webchat or social media show an influx of customers.

Once a multi-channel platform for digital communication is operable, solving customer queries can be conducted at a low cost, in particular, by using text-based webchats compared to commonly used phone calls. On average, costs for webchat sessions are 40% lower compared to equivalent phone calls.

Customer satisfaction may be a measurement that determines how well a contact center's products or services meet customer expectations. It may be considered one of the most important indicators of purchase intentions and customer loyalty.

Customer satisfaction may be increased due to optimized multi-channel support and reduced waiting times and low abandonment rate of interactions between customers and agents.

Poor customer service cost businesses more than $75 billion a year, according to a report from NewVoiceMedia. Just a five percent lift in customer retention can boost a company's profitability by as much as 75 percent, according to Bain & Company.

Thus, addressing customer queries effectively using text-based digital channels can offer a competitive advantage to contact centers that can provide a unique customer experience and may result in an increasing number of customers switching from traditional phone call-based interactions to digital channel-based interactions using text chat. A digital channel-based interaction may also improve an agent's productivity as it allows agents serving customers queries more efficient than via a traditional phone call.

For example, use of digital communication channels that are based on text-based chat interaction between customers and agents may allow dealing with multiple queries of customers simultaneously.

Accordingly, organizations and businesses may encourage customers to prefer the use of digital communication channels, e.g. online chats, over traditional communication channels such as phone calls.

However, businesses may experience that customers reverse the transition from digital to traditional communication channels and may undermine efforts of businesses to implement digital communication channels.

Thus, there is a need for a solution that allows identifying customers that transition from digital communication channels to traditional voice channels and allows identifying issues that led to a transition from digital communication channels to traditional voice channels.

SUMMARY OF THE INVENTION

Improvements and advantages of embodiments of the invention may include automatically detecting interaction data in interactions that shows a transition of an interaction between parties, e.g. agent devices and customer devices, from a first connection type to a second connection type.

The transition from traditional connection types such as voice connection between parties to text-based connection types may lead to a faster resolution of customer issues and, thus, a reduction in operational costs and increased engagement opportunities for customers to interact with agents of contact centers.

In particular, improvement and advantages of embodiments of the invention may include identifying customers that transition from a text-based, digital connection type to a traditional connection type, e.g. a phone call when contacting a contact center, in real-time, identifying reasons for the transition and providing opportunities to resolve issues that led to a switch in the connection types.

One embodiment may include a method of managing interactions between agent devices and customer devices, wherein the method comprises: identifying interaction data in interactions between an agent device and a customer device that show a transition from a first connection type to a second connection type; and when a transition in connection types is identified, initiating one or more remedial measures.

In one embodiment, the transition in connection types between the agent device and the customer device is a transition from a visual connection type to an audio connection type.

In one embodiment, the remedial measures are selected from the group consisting of: alerting a contact center of the transition from the first connection type to the second connection type; notifying the customer device of the transition in connection type from the first connection type to the second connection type; requesting feedback from the customer device on the transition from the first connection type to the second connection type; and classifying the customer device as having transitioned from the first connection type to the second connection type for subsequent interactions.

In one embodiment, notifying the customer device of the transition in connection types comprises informing the customer device of the availability of the first connection type.

In one embodiment, alerting the contact center comprises sending the agent device during the transition from the first connection type to the second connection type a notification that the customer device is changing the connection type.

In one embodiment, the transition from the first connection type to the second connection type is identified by interaction data in interactions selected from a group consisting of: customer sentiments, customer usage trend, transfer rate, abandonment rate, customer category, customer grievance rate, agent utilization.

In one embodiment, interaction data is identified in real-time.

In one embodiment, interaction data is identified prior to the transition from the first connection type to the second connection type.

In one embodiment, when interaction data shows a transition from the first connection type to the second connection type, the agent device is assigned a training module.

In one embodiment, the agent device reconnects to the customer device via the first connection type.

One embodiment may include a system for managing interactions between agent devices and customer devices, the system comprising: a computing device; a local storage; a memory; and a processor, the processor configured to: identify interaction data in interactions between an agent device and a customer device that show a transition from a first connection type to a second connection type; and when a transition in connection types is identified, initiating one or more remedial measures.

One embodiment may include a method of monitoring conversations between agent devices and customer devices, wherein the method comprises: monitoring conversation data in conversations between an agent device and a customer device that show a switch from a first communication type to a second communication type between the agent device and the customer device; and when a switch in communication types between the agent device and the customer device is identified as initiated by the customer device, initiating one or more measures that revert the communication type switch.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a flowchart of methods of managing interactions between an agent device and a customer device, according to some embodiments of the present invention.

Figure 1:
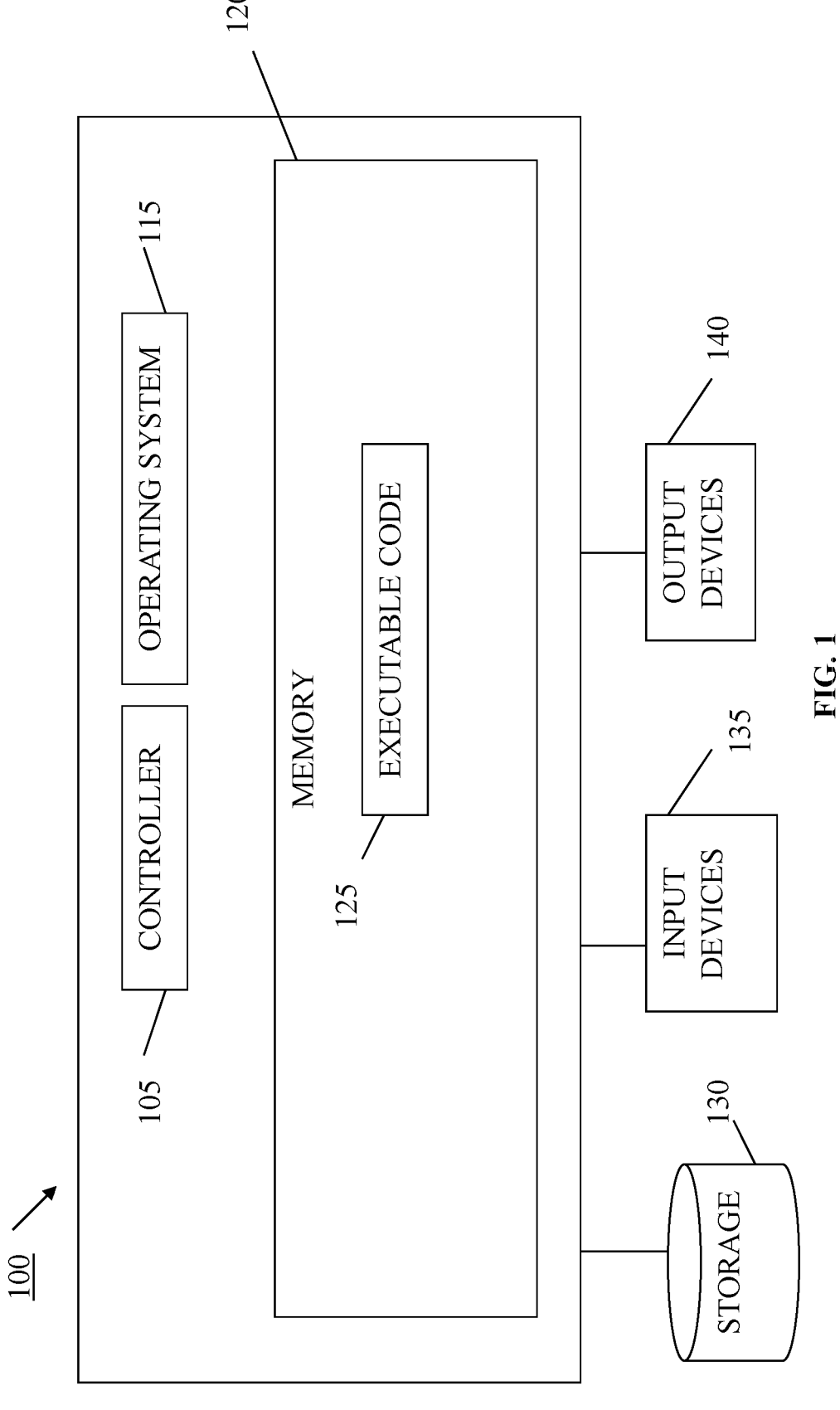
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "contact center" may refer to a centralized office used for receiving or transmitting a large volume of enquiries, communications, or interactions. The enquiries, communications, or interactions may utilize telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "call center" may refer to a contact center that primarily handles telephone calls rather than other types of enquiries, communications, or interactions. Any reference to a contact center herein should be taken to be applicable to a call center, and vice versa.

As used herein, "interaction" may refer to a communication between two or more people (e.g., in the context of a contact center, an agent and a customer), typically via devices such as computers, customer devices, agent devices, etc., and may include, for example, voice telephone calls, conference calls, video recordings, face-to-face interactions (e.g., as recorded by a microphone or video camera), emails, web chats, SMS messages, etc. An interaction may be recorded. An interaction may also refer to the data which is transferred and stored in a computer system recording the interaction, the data representing the interaction, including for example voice or video recordings, data items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Interactions may be computer-based if, for example, the interaction has associated data or metadata items stored or processed on a computer, the interaction is tracked or facilitated by a server, the interaction is recorded on a computer, data is extracted from the interaction, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based representations (e.g., using automatic speech recognition). Interaction data may be produced, transferred, received, etc., asynchronously. For example, in a voice call, there may be periods of rapid conversation and other periods with no conversation (e.g., when an agent puts the customer on hold).

As used herein, "agent" may refer to a contact center employee that answers incoming interactions, and may, for example, handle customer requests.

As used herein, "supervisor" may refer to a contact center employee that, possibly among other responsibilities, mediates, supervises, or intervenes in contact center interactions. In some embodiments, a "supervisor" may not be a person at all, but rather a supervisor computer system.

A used herein, "real-time" or "real time" may refer to systems or methods with an event to system response time on the order of seconds, milliseconds, or microseconds. It may be preferable that the event to system response time is minimized, e.g., it is in the order of milliseconds or microseconds. In the following description, it is to be understood that systems and methods that are described as real-time embodiments may be embodiments that are suitable for real-time implementation, but which may additionally be suitable for implementation that is not in real time.

A "traditional channel" for an interaction between an agent and a customer may be a voice channel, for example communication via a telephone call between an agent using a telephone and a customer using a telephone, e.g. a mobile phone. By contrast, "digital channels" for an interaction between an agent and a customer may be electronic, Internet-mediated communication in text form, e.g. communication via online chats, chat interfaces, messenger services, or social media applications.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. computing device 200, agent device 210, customer device 220, digital detection module, recommendation module, and modules in FIGS. 2, 3, 4, 5, 6, 7, 8, 9, 10, 11, 12, 13 may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
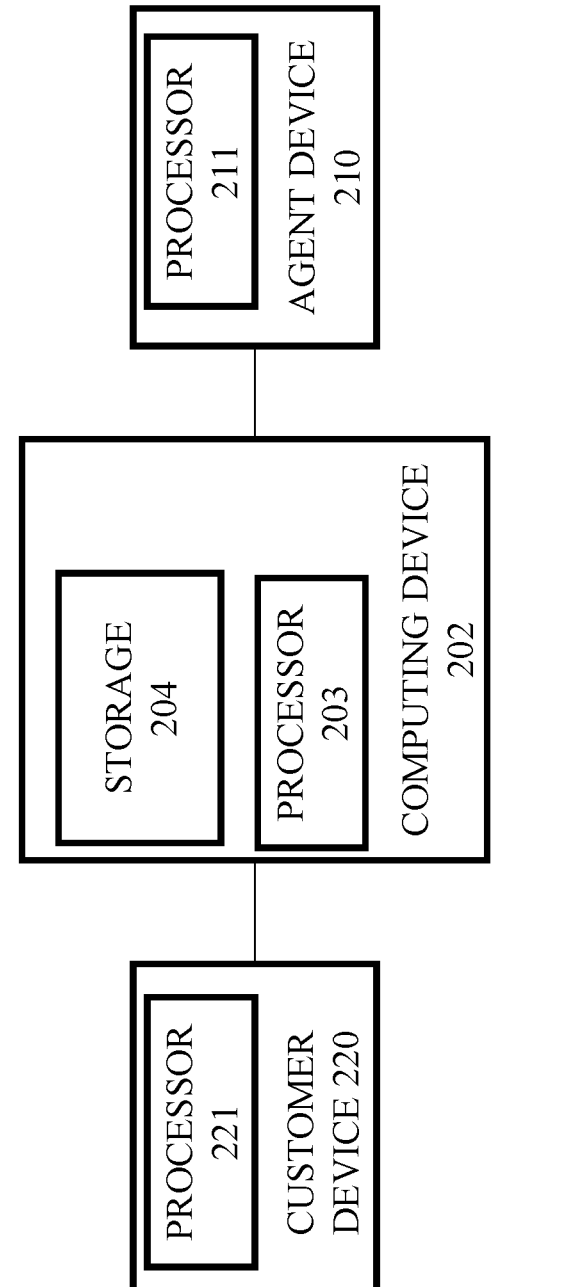
FIG. 2 is a schematic drawing of a system according to some embodiments of the invention.

FIG. 2 is a schematic drawing of a system 200 according to some embodiments of the invention. System 200 may include a computing device 202 comprising a processor 203 and storage 204, for example a contact center database. Computing device 202 may be connected to an agent device 210 that includes processor 211. In one embodiment, computing device 202 may be connected to a plurality of agent devices 210. Computing device 202 may be connected to customer device 220. Customer device 220 may include processor 221.

Computing devices 202, 210 and 220 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 202, 210 and 220 may include one or more input devices, for receiving input from a user (e.g., via a pointing device, click-wheel or mouse, keys, touch screen, recorder/microphone, or other input components). Computers 202, 210 and 220 may include one or more output devices (e.g., a monitor, screen, or speaker) for displaying or conveying data to a user.

Any computing devices of FIGS. 1 and 2 (e.g., 100, 202, 210 and 220), or their constituent parts, may be configured to carry out any of the methods of the present invention. Any computing devices of FIGS. 1 and 2, or their constituent parts, may include a digital drift detection module 410, a recommendation module 414, a customer identification module 418, a feedback notification module 416, or another engine or module, which may be configured to perform some or all of the methods of the present invention. The systems and methods of the present invention may be incorporated into or form part of a larger platform or a system/ecosystem, such as customer relationship management (CRM) platforms or management platforms. The platform, system, or ecosystem may be run using the computing devices of FIGS. 1 and 2, or their constituent parts. For example, a processor such as processor 203 of computing device 202 processor 211 of device 210, and/or processor 221 of computing device 220 may be configured to initiate an interaction between the agent device and the customer device, wherein the interaction includes data items, e.g. metadata items. For example, a processor such as processor 203, 211 and/or 221 may be configured to initiate the interaction. For example, a processor such as processor 203, 211 and/or 221 may be configured to initiate an interaction and to store interaction data of the interaction in a local storage 204. For example, a processor such as processor 203, 211 and/or 221 may be configured to send and receive interaction data. For example, a processor such as processor 203 may be configured to receive interaction metadata to store interaction data in storage 204, e.g. a contact center database 402, and to process interaction data, e.g. to carry out natural language processing or retrieve values of interaction data of the interaction.

FIG. 3 shows a flowchart of a method 300 for managing interactions between an agent device, e.g. agent device 210 and a customer device, e.g. customer device 220. The system displayed in FIG. 2 and the method shown in FIG. 3 refer to the management of interactions between an agent device and a customer device, however, the system and the method may also be used to manage interactions between one or more agent devices and customer devices. According to some embodiments, some or all of the steps of the method are performed (fully or partially) by one or more of the computational components, for example, those shown in FIGS. 1 and 2.

Method 300 for managing interactions may be executed by a processor of computing device 202, for example processor 203. An interaction may be an interaction via a digital channel, e.g. a text-based chat such as an online chat or a text chat using an application between an agent device of an agent and a customer device of a customer. An agent device may be, for example, a computing device, mobile phone or portable computing device such as computing device 100 or computing device 210. A customer device may be, for example, a computing device, mobile phone or portable computing device such as computing device 100 or computing device 220.

In operation 302, interaction data may be located or identified in interactions between an agent device and a customer device that show a transition from a first connection type to a second connection type (step 302). An interaction may include interaction data, e.g. metadata items. Interaction data items may be obtained from or identified in the interaction, for example by being derived from one or more of, for example: agent screen, customer screen, and digital agent interactions such as web chats, email conversations or messenger services. Interaction data items may be data describing the interaction, for example, pieces of information that may allow identifying a device associated with the interaction such as an agent device or customer device producing interaction data, to identify data of active software that is executed on an agent device or customer device during the interaction, or to identify data extracted from a software interface that is shared between an agent device and a customer device during an interaction. Interaction data that may be obtained from an interaction may also include, for example, agent sentiment, customer sentiment, agent desktop activity, customer overall satisfaction.

In an embodiment, conversations between an agent device and a customer device may be monitored. For example, monitoring conversations between an agent device and a customer device may be executed by a processor of computing device 202 such as processor 203. A conversation may be a conversation via a digital channel, e.g. a text-based chat such as an online chat or a text chat using an application between an agent device of an agent and a customer device of a customer. In step 302, conversation data may be located or monitored in conversations between an agent device and a customer device to identify data that shows a switch from a first communication type to a second communication type between the agent device and the customer device.

Interaction data obtained from an interaction between an agent device and a customer device may show or indicate a transition from a first connection type to a second connection type. A first connection type may be a digital channel, for example a visual connection type such as a connection between an agent and a customer via a text-based chat. A second connection type may be a traditional channel, e.g. an audio connection type such as a phone call. In an embodiment, a transition from a first connection type to a second connection type may be a transition from a visual connection type to an audio connection type.

A transition from a first connection type to a second connection type may be identified by interaction data in interactions. Interaction data in interactions that may indicate a transition from a first connection type to a second connection may be selected from a group including customer sentiments, customer usage trend, transfer rate, abandonment rate, customer category, customer grievance rate, agent utilization.

Figure 4:
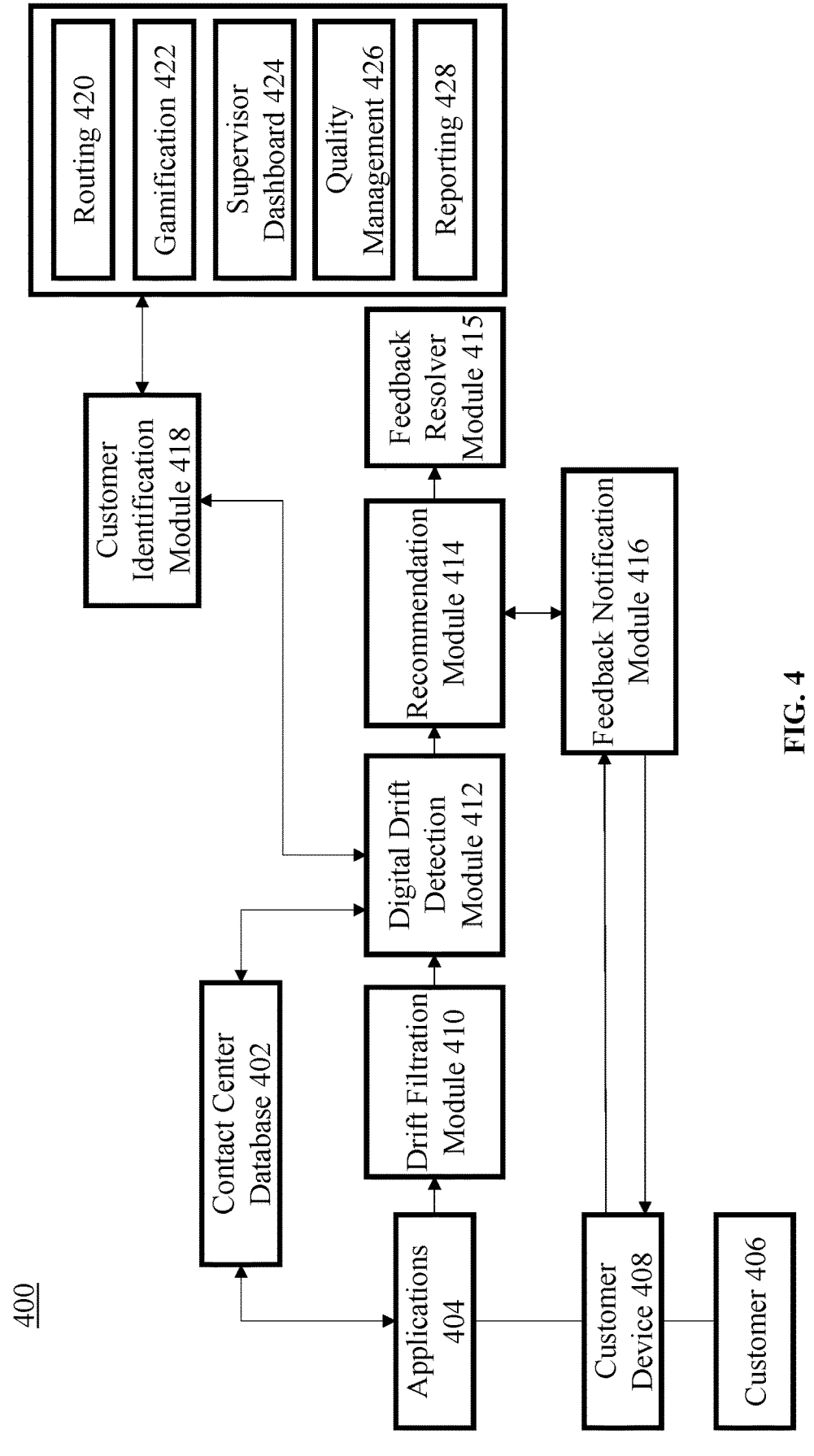
FIG. 4 depicts a dataflow diagram for managing interactions between an agent device and a customer device, according to some embodiments of the present invention.

Interaction data may be identified in real-time. Interaction data that may suggest a transition from a first connection type to a second connection type may be identified prior to the transition from a first connection type to a second connection type, for example, using natural language processing which may identify customer sentiments. For example, a frustrated customer complaining about a clients inactivity during an interaction may be identified during a text chat via a drift detection module 412 of contact center 400 as shown in FIG. 4. Identification of a customer's sentiment may be carried out, for example using natural language processing and detection of key words in chat protocols of an interaction by drift detection module 412.

Some embodiments may include when a transition in connection types is identified, initiating one or more remedial measures (304). In an embodiment, in step (304), when a switch in communication types between the agent device and the customer device is identified as initiated by the customer device, one or more measures that revert the communication type switch are initiated.

A measure or a remedial measure may be an action carried out by one or more modules of a contact center, e.g. contact center 400 as shown in FIG. 4, to prompt a customer not to transition from a first connection type to a second connection type. Measures or remedial measures may be actions that are automatically initiated, e.g. via a module of contact center 400, or may be automatically suggested to an agent, e.g. an agent using agent device 210, or a customer, e.g. a customer 406 using customer device 220 or 408. In case that a transition from a first connection type to a second connection type may have been identified, a remedial measure may include attempting to encourage a customer transiting from a first to a second connection type to reconnect to the contact center via the first connection type, e.g. to reconnect via a text-based connection. A remedial measure may include alerting a contact center, e.g. contact center 400 as shown in FIG. 4, of the transition of a customer from a first connection type to a second connection type.

For example, an agent or a supervisor of an agent may be alerted, e.g. by customer identification module 418, of a transition from a first connection type to a second connection type or a potential risk that a customer might attempt a transition from a first connection type to a second connection type by routing module 420 informing an agent or supervisor of a transition via an alert that is displayed on an agent's computing device, e.g. dashboard of computing device, e.g. agent device 210 prior to the start of a subsequent interaction with a customer or during an ongoing interaction with a customer in real-time. For example, a report showing issues that may result or may have resulted in a transition may be displayed on a dashboard, e.g. dashboard 424 as shown in FIG. 4.

A remedial measure may include notifying a customer device, e.g. customer device 220, of a transition in connection type from a first connection type to a second connection type. For example, a customer, e.g. using customer device 220 or 408, experienced a connection issue during an interaction using a digital channel and may have forgotten how to rejoin an interaction with an agent via a digital channel and, as a result, they may consider using a traditional channel, e.g. a phone call. A notification may be sent to the customer, e.g. via c-mail, push notification or direct message using an app or text message, to make a customer aware of options that allow a customer rejoining an abandoned interaction, e.g. a text-based chat, with an agent, and allow a customer resuming the interaction via the first connection type that was initially used. Alternatively, a customer using a customer device, e.g. customer device 220 or 408, may be informed of the availability to start a new interaction via the first connection type, e.g. a digital channel.

A remedial measure may include requesting feedback from a customer, e.g. using customer device 220, on the transition from the first connection type to the second connection type. For example, a customer may be sent a survey and may be asked to indicate reasons why they decided to transition from a first connection type to a second connection type. Based on the received feedback from a customer, contact center 400 may allocate agents to training programs to improve their performance in interactions with customers, e.g. to improve their multitasking skills when dealing with multiple text-based chats at the same time.

A remedial measure may include classifying a customer device, e.g. customer device 220 or 408, as having transitioned from a first connection type to a second connection type for subsequent interactions. For example, a contact center, e.g. contact center 400, may store information in storage, e.g. contact center data base 402 as shown in FIG. 4 that indicates that customer 406 is likely to transition from a first connection type to a second connection type. Based on the stored indication for a customer, an agent may be reminded of issues that arose in previous interactions and led to a transition from a first connection type to a second connection type. Thus, an agent may be aware of special needs of a customer and may be able to address the needs of a customer once an interaction has started. For example, an agent may be reminded that a customer prefers to have a text chat in a specific language and an agent that is proficient in the customer's preferred language can interact with the customer to avoid language barriers leading to a transition from a first connection type to a second connection type.

FIG. 4 is a high-level block diagram of an exemplary system, for example used in a contact center such as contact center 400 to manage interactions between agent devices and customer devices.

When a customer, e.g. customer 406, uses an application in an interaction with an agent, e.g. application 404, via a customer computing device, e.g. customer device 408, interaction data items may be sent from a customer device to a database, e.g. to contact center data store 402, of a contact center 400. Thereby interaction data items that may be generated and/or transmitted to a contact center data store may be analyzed by a drift filtration module 410 before transmission to a digital drift detection module 412 for the calculation of a digital drift quotient (DDQ). A DDQ may be a score that is calculated for a customer, e.g. using customer device 220 or 408, and may be calculated from interaction data that has been received a contact center in previous interactions with the customer or during an ongoing interaction. The score may be compared against a standard threshold and indicates whether or not a customer shows a behavior that leads to a transition of a customer from a first connection type to a second connection type. A legitimate drift filtration module may identify interaction data that indicates a legitimate change from a first connection type to a second connection type, e.g. from a digital text-based communication channel to a traditional voice communication channel. A legitimate change from a first connection type to a second connection type may be observed, for example, when an agent requested a change from a first connection type to a second connection type. For example, an agent, e.g. using agent device 210, may request a change from a text based connection to a voice based connection, for example, when a text-based connection is unstable due to connectivity issues.

For example, interaction data items that include terms such as "ELEVATE_FLAG", "ELEVATE_FROM_A-GENT_ CONTACT_KEY", "ELEVATE_FROM_AGENT_ CONTACT_NO", "ELEVATE_FROM_AGENT_NO", "ELEVATE_REASON", "ELEVATE_FROM_CHAN-NEL_NO", "ELEVATE_FROM_CHANNEL_KEY", "ELEVATE_FROM_AGENT_KEY", "ELEVATE_FRO-M_AGENT_CONTACT_ID" may indicate a legitimate change in connection type. Additionally, other transitions from a first connection type to a second connection type that have been initiated by an agent may indicate a legitimate drift and may be ignored in the calculation of a DDQ.

Drift filtration module 410 may transmit filtered interaction data to a digital drift detection module 412. Digital drift detection module 412 may extract parameters of interaction data to calculate scores or directly extracts scores from interaction data to calculate a DDQ.

Figure 5:
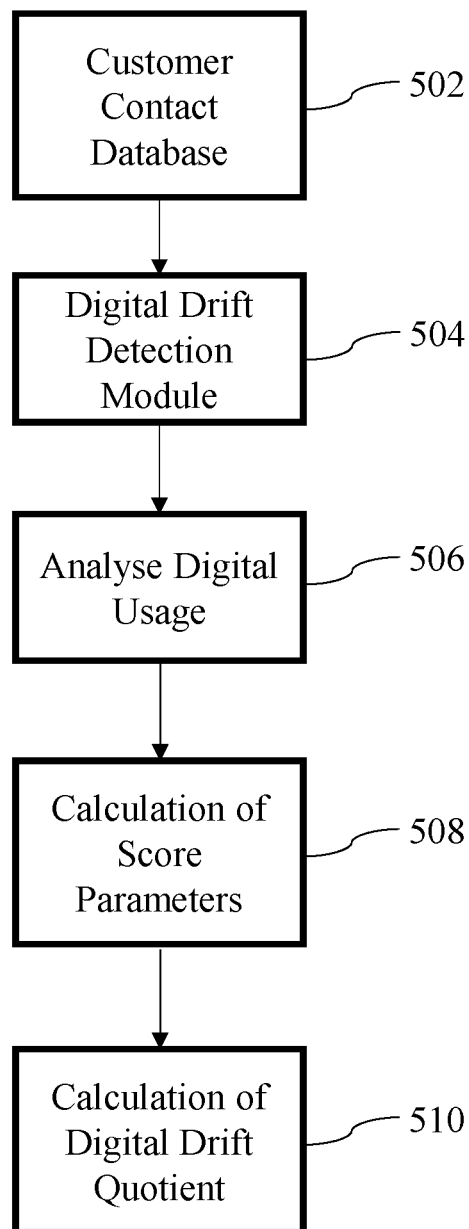
FIG. 5 depicts a dataflow diagram of a digital drift detection module for managing interactions between an agent device and a customer device, according to some embodiments of the present invention.

FIG. 5 is a flow-chart describing steps that are carried out at the digital drift detection module 412 in the calculation of a DDQ. Customer contact database 502 may transmit interaction data items to digital drift detection module 504. Digital drift detection module 504 may analyze content that is present in an interaction. Digital drift detection module 504 may calculate parameters for scores that are used in the calculation of the DDQ.

Interaction data items may be used, for example, to characterize a connection type between an agent device and a customer device, e.g. by identifying a digital channel usage of existing digitally inclined customers by calculating a digital usage (DUS) score for a customer.

Based on previous interactions between an agent, e.g. using agent device 210, and a customer, e.g. using customer device 220, connection types that have previously been used in interactions between an agent device and a customer device may be identified to assess whether there is a transition from a first connection type, e.g. a text-based connection to a second connection type, e.g. a voice connection:

For the calculation of a DUS, parameter "a" may be defined as a number of text-based interactions for a specific time interval M and parameter "b" may be a number of voice-based interactions for a specific interval M.

Accordingly, the digital usage score (DUS) for a specific time interval M may be calculated as outlined in example formula 1:

$$DUS = [(a - b)/(a + b)] \cdot 100 \qquad \text{Formula 1}$$

In case that a DUS score is greater than 0, the customer, e.g. using customer device 220, may be inclined to text-based interactions. In case the DUS score is lower than 0, a customer may be inclined to non-digital interaction methods, e.g. voice-based interactions.

Natural language processing may be used to calculate a sentiment score (ISS) from interaction data items for interactions between a customer device 220 and an agent device 210 for a time interval using a digital channel, e.g. text-based channel, to understand the behavior of customers in response to provided services of a contact center. A time interval may be one or more interactions.

An ISS score may be calculated for agent and customer behavior in agent-customer interactions, e.g. to identify whether an agent was able to fulfil a customer request. A customer sentiment score and an agent sentiment score may be generated, e.g. using natural language processing and/or the identification of key words, from a chat transcript obtained from an interaction via a digital channel. For example, using natural language processing, it can be identified whether a customer is unsatisfied with an answer provided by an agent by the identification of follow-up questions by a customer in response to an answer provided by an agent. A final sentiment score (ISS) may thus comprise a value for a customer sentiment score and a value for an agent sentiment score as shown in example formula 2:

$$ISS = \text{Customer Sentiment Score} + \text{Agent Sentiment Score} \qquad \text{Formula 2}$$

In the calculation of customer sentiment scores and agent sentiment scores, interaction data of agent-customer interactions, for example a chat protocol of a digital channel, may undergo a sentiment analysis and irrelevant words (e.g. and, or . . . ), duplicate words, phrases, stop words (is, a, and, goodbye, . . . ) and/or punctuation may be deleted.

An artificial intelligence based model may be trained, e.g. using word samples of chat protocols, to recognize sentiments in interactions between agents and customers. E.g. it may be able to identify emotions or behaviors of parties during an interaction, e.g. by correlating emotions or behaviors to prerecorded or learned sentiments. Thus, it may allow gauging customer's and agent's emotions during an interaction. For example, a positive sentiment may result in a high score and negative sentiment may result in a low score, e.g. a score scale may range from 0-100 and a score of 100 may be considered a high score indicating high customer satisfaction, and a score of 0 may be considered a low score indicating low customer satisfaction. In the calculation of a sentiment score, words present in an interaction that have been identified as relating to a positive sentiment may be assigned a +1 scoring, while words that have been identified as relating to a negative sentiment may be assigned a −1 scoring.

A customer category score (CCS) may reflect a specific customer category, e.g. a customer with a low, normal or high volume of usage. For example a specific score may be allocated to a specific category or usage volume:

Small and medium-sized businesses: CCS=−10
    Premier category: CCS=−20
    Key category: CCS=−50
    Specific CCS scores may be set automatically for specific customer categories, e.g. by digital drift detection module 412. CCS values for each specific category may be predetermined based on a customer audience that is targeted by a digital channel. For example, for a digital channel that handles issues of customers using an online banking application, "small and medium-sized businesses" may be businesses with a turnover of up to $500,000 per year, "premier category" may be businesses with a turnover of between $500,000 and $1,000,000 per year and "key category" may be businesses with a turnover of more than $1,000,000 per year.

A new customer onboarding rate (COS) may be a parameter that indicates the number of new customers per month that use a digital channel, e.g. a text chat, for the first time. Accordingly, a low customer onboarding for a digital channel may indicate issues with the services of a contact center leading to customers hesitating to use a digital channel. A COS rate may be calculated according to example formula 3:

$$COS = \text{Total Customer Onboarded in Month m}/100 \qquad \text{Formula 3}$$

A transfer rate (TRS) may describe the ratio of the number of transferred interactions from a first connection type to a second connection type for an agent, e.g. from a digital to a voice connection type, to the number of all interactions handled by an agent and may be calculated according to example formula 4:

$$TRS = \frac{\text{Total Calls Transferred from Digital to Voice}}{\text{Total Calls Handled by the Agents}} \cdot 100\% \qquad \text{Formula 4}$$

An abandonment rate (ARS) may be a rate that is calculated for a contact center and may reflect a total number of customers who have left an ongoing interaction on a digital channel, e.g. as a result of non-response to a query or any other occurring issues. An ARS is a ratio of the number of abandoned interactions to a number of all inbound interactions and is calculated according to example formula 5:

$$ARS = \frac{\text{Total number of abandoned Interactions}}{\text{TTotal number of inbound interactions}} \cdot 100\% \qquad \text{Formula 5}$$

An agent utilization rate on digital channels (ADUS) may be a rate that reflects the ratio of the product of channels and average handling time per month to the agent's work capacity for a month. A low ADUS rate may indicate that customers hesitate to use the digital channel. An ADUS rate may be calculated as the ratio of the product of average inbound interactions on a digital channel handled over a month (Avg. Inb. Int. Digital Channels per month) multiplied with the average handling time (Avg. Inb. Handle Time), and the product of average number of days worked in a month (Avg. No. of work days in month) multiplied by the number of work hours per day (No. work hours per day) multiplied by 60 minutes, as shown in example formula 6:

$$ADUS = \frac{(Avg.Inb.Int. \text{ Digital Channels per month}) \cdot (\text{Average } Inb. \text{ Handle Time})}{(Avg. \text{ No. of work days in month}) \cdot (\text{No. work hours per day}) \cdot (60 \text{ Minutes})} \qquad \text{Formula 6}$$

A customer grievance rate (CGS) may be calculated for customers of digital channel services and may reflect the number of queries transferred from a customer to a contact center for a specific time interval, e.g. a day, a week or a month. Customer grievance in queries sent from a customer, e.g. via customer device 408, to a contact center may be identified via natural language processing. The CGS score may be calculated according to example formula 7 and may be the number of received customer grievance for a specific time interval divided by 100:

$$CGS = \text{Total Grievance raised by customer}/100 \qquad \text{Formula 7}$$

An agent utilization rate on traditional channels (ATUS) may be the ratio of work produced divided by work capacity. For example, the ATUS may be calculated via the product of average inbound interactions on traditions channels handled in month (Avg. Inb. Int. on Traditional Channels per Month) and average inbound handle time (Avg. Inb. Handle Time) divided by the product of average number of work days in a month (Avg. No. of work days in month), number of work hours in a day (No. work hours per day) and 60 minutes (60 min.). If the ATUS rate is high on traditional channels, it may indicate that many customers prefer the use of a traditional channel to interact with a contact center, e.g contact center 400. The ATUS rate may be calculated according to example formula 8:

$$ATUS = \frac{(Avg.Inb.Int. \text{ Traditional Channels per month}) * (\text{Average } Inb. \text{ Handle Time})}{Avg. \text{ No. of work days in month}) \cdot (\text{No. work hours per day}) * (60 \text{ Minutes})} \qquad \text{Formula 8}$$

Rates for parameters COS, TRS, ARS, ADUS, ATUS and ATRS may be transformed into score according to the table below. For example, an ARS rate of 65% may result in a score of 40.

Rate between 1%-20%, score is 10
    Rate between 21%-40%, score is 20
    Rate between 41%-60%, score is 30
    Rate between 61%-80%, score is 40
    Rate between 81%-100%, score is 50
    The scores for the parameters for COS, TRS, ARS, ADUS, ATUS and ATRS may be used in the calculation of a positive and negative drift quotients.

In the calculation of a positive drift quotient (PDQ), values of scores for digital usage score (DUS), interaction sentiment score (ISS), agent digital utilization score (ADUS) and customer onboarding score (COS) may be used. A PDQ may be calculated according to example formula 9. Each of the scores may be multiplied with a weight W to increase the influence of the score in the calculation of PDQ. For example, a contact center may provide a new digital channel to customers and, thus, the number of customers that are exposed to the new digital channel and use the digital channel for the first time may be considered an important factor. Accordingly, a weight W (e.g. an integer number >1) may be added to a COS score if the total number of customers per month that have used a digital channel, e.g. a text chat, for the first time is considered a dominant factor in the calculation of a PDQ. The weighting of a score may be automatically carried out by a contact center. For example, a contact center that provides a digital channel has identified a DUS score as an important parameter in the calculation of a PDQ value. Accordingly, digital drift detection module 412 may be set to an integer number >1, e.g. a weight of 5. In case that an ISS score is considered a parameter that is less important in the calculation of an ISS, a weight for an ISS score may be set as 1. A value of a weight may be automatically set by a digital drift detection module 412 and may be determined based on customer feedback that has been received for a score.

For example, weights for scores in the calculation of PDQ and NDQ may be in the range of 1-5. If the number of customers that have provided feedback that is used in the calculation of a score, e.g. a DDQ score, is higher than 90% of all customers, a weight for the score may be set to 5. If 75-90% of all customers have provided feedback that is used in the calculation of a particular score, the weight for the score may be set to 4. If 50-75% of all customers have provided feedback that is used in the calculation of a particular score, the weight for the score may be set to 3. If 30-50% of all customers have provided feedback that is used in the calculation of a particular score, the weight for the score may be set to 2. If 0-30% of all customers have provided feedback that is used in the calculation of a particular score, the weight for the score may be set to 1.

$$PDQ = [(DUS \cdot W) + (ISS \cdot W) + (ADUS \cdot W) + (COS \cdot W)] \quad \text{Formula 9}$$

In the calculation of a negative drift quotient (NDQ), scores such as customer category score (CCS), customer grievance score (CGS), transfer rate score (TRS), abandonment rate score (ARS), agent traditional utilization score (ATUS) and agent turnover rate score (ATRS) may be used. An NDQ may be calculated according to example formula 10. Each of the scores may be multiplied with a weight W to increase the influence of the score in the calculation of NDQ.

$$NDQ = [(CCS \cdot W) + (CGS \cdot W) + (TRS \cdot W) + (ARS \cdot W) + \quad \text{Formula 10}$$
$$(ATUS \cdot W) + (ATRS \cdot W)]$$

A digital drift quotient DDQ may be calculated by subtracting a negative drift quotient (NDQ) from a positive drift quotient (PDQ), e.g. according to example formula 11:

$$DDQ = NDQ - PDQ \quad \text{Formula 11}$$

A DDQ value calculated for a customer, e.g. customer 406 using customer device 408, in an interaction with an agent may be compared with a threshold value to identify whether a customer is at risk of transitioning from a first connection type to a second connection type. A threshold may be automatically created or set, for example, by digital drift detection module 412 or 504. A threshold value may be an average value of DDQ values that have been calculated for one or more customers that have used a specific type of interaction, e.g. all customers that have used a digital channel to contact a contact center, e.g. contact center 400, in a specific time period, e.g. within the last month. When a value for a DDQ is greater than a threshold value, a customer may be transitioning from a first connection type to a second connection type. When a value for a DDQ is lower than a threshold value, a customer may not be transitioning from a first connection type to a second connection type. For example, a threshold value can be defined as 0. Accordingly, if a negative DDQ value is calculated for an interaction, the interaction may be an interaction that may not lead to a transition from a first connection type to a second connection type—"no drift". If a positive DDQ value is calculated for an interaction, the interaction may be an interaction that may lead to a transition from a first connection type to a second connection type—"drift". A threshold value may be automatically generated by a contact center for a digital channel or a module within a contact center, e.g. a digital drift detection module 412 and may take into account, for example, an availability period of a channel (e.g. a period of time since a digital channel has been made available to customers).

In an embodiment, one or more factors may be used in the calculation of a digital drift quotient DDQ: For example, a digital channel usage trend of existing digitally inclined customers, customer sentiment trend of digital channel, transfer rate of ongoing interaction from digital to voice channel, customer category, e.g., verified or influence people witnessing drift, customer usage trend of traditional channels primarily post first digital transition, contact center KPI deterioration on digital channels, grievance rate/trend on digital channels, abandonment rate on digital channels, digital channel onboarding trend of new customers, or agent utilization rate on traditional channels. A digital channel usage trend may be, for example, a value for a frequency in which customers have used a digital channel of a contact center for a specific period of time, e.g. 3 times in a month.

Referring back to FIG. 4, a calculated DDQ value via digital drift detection module 412 may be sent to recommendation module 414. Recommendation module 414 may receive feedback from a customer, e.g. from customer 406, on a previous interaction with an agent of a contact center, e.g. contact center 400, from feedback notification module 416 in addition to a DDQ value for the same interaction with the customer.

Figure 6:
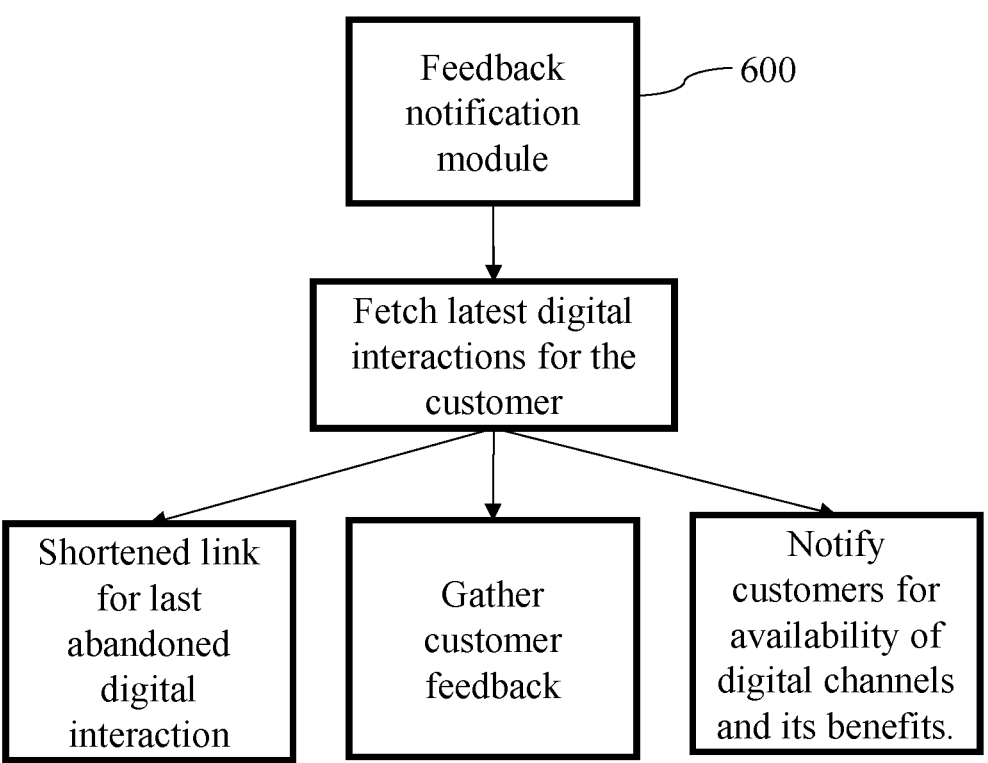
FIG. 6 depicts a dataflow diagram of a feedback notification module for managing interactions between an agent device and a customer device, according to some embodiments of the present invention.

FIG. 6 is a flow chart depicts a dataflow diagram of a feedback notification module 600 for managing interactions between an agent device and a customer device, according to some embodiments.

After an interaction with a contact center, e.g. an agent of contact center 402, a customer, e.g. customer 406, may receive a notification to provide feedback in response to a previous connection type in an interaction between an agent and the customer, e.g. via agent device 210 and customer device 220 or 408. The notification may include customer information regarding the availability of digital channels (there can be instances in which the customer forgets the entry point for a digital interaction (e.g. a missed email, a facebook page notification, a closed chat)) and may further prompt a customer to provide feedback, e.g. on a recent interaction between an agent and a customer. For example, a shortened link may be sent to a customer to gather feedback on their interaction experience using a digital channel of a contact center 400. Feedback provided by a customer, e.g. using customer device 408, may be sent to the feedback notification module 416. Feedback received from a customer may be transmitted to recommendation module 414 and may be assessed in light of a calculated DDQ by feedback resolver module 415. For example, in response to the feedback, feedback resolver module 415 may receive recommendations from recommendation module 414 and may apply one or more remedial measure, for example an automated communication may be sent to customers regarding corrective measures taken to improve their digital journey, e.g. automated training programs may be assigned to agents.

Figure 7:
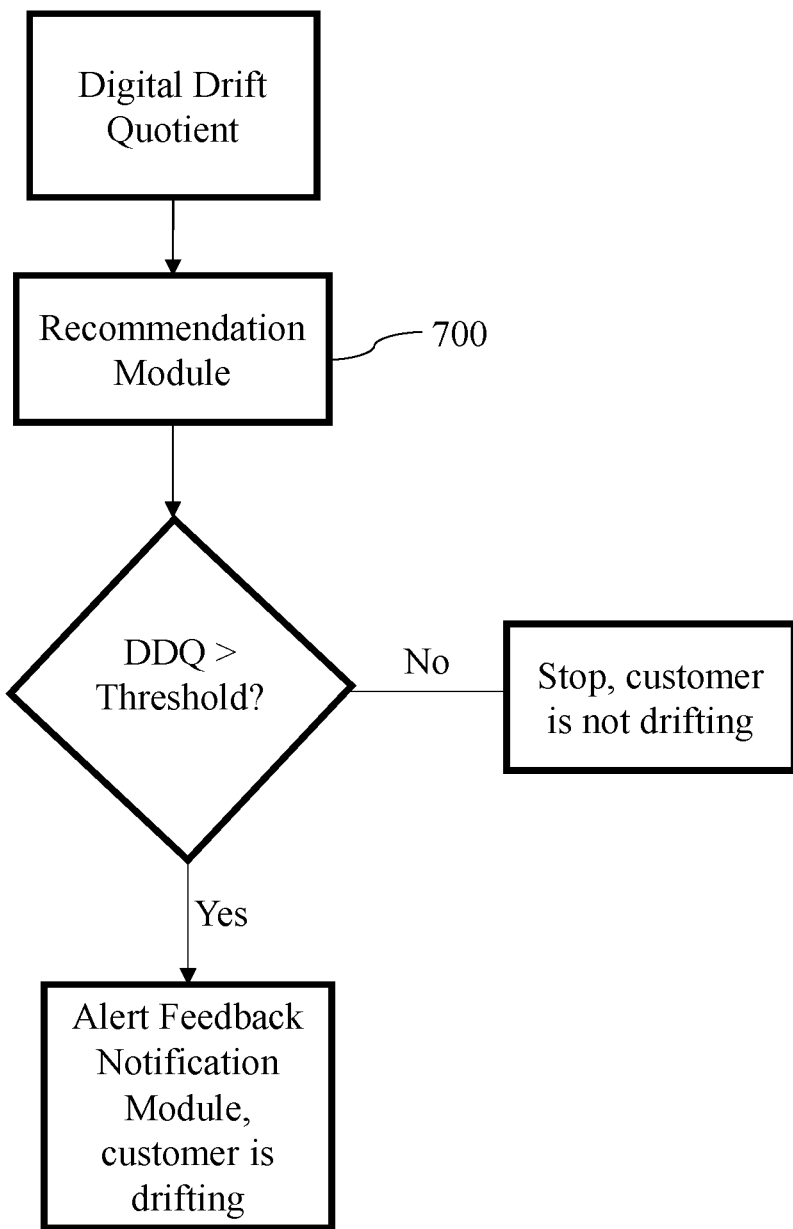
FIG. 7 depicts a dataflow diagram of a recommendation module for managing interactions between an agent device and a customer device, according to some embodiments of the present invention.

FIG. 7 depicts a dataflow diagram of a recommendation module 700 for managing interactions between an agent device and a customer device. A recommendation module 700 may receive a digital drift quotient DDQ, e.g. calculated via drift detection module 412 or 504. The DDQ value may be compared against a threshold value. In case that the DDQ value is greater than the threshold value, feedback notification module 600 may be notified that a customer may be changing from a first connection type to a second connection type, also herein referred to as "drifting". In case that a DDQ value may be lower than the threshold value, a customer may not be changing from a first connection type to a second connection type, also herein referred to as "not drifting".

Figure 8:
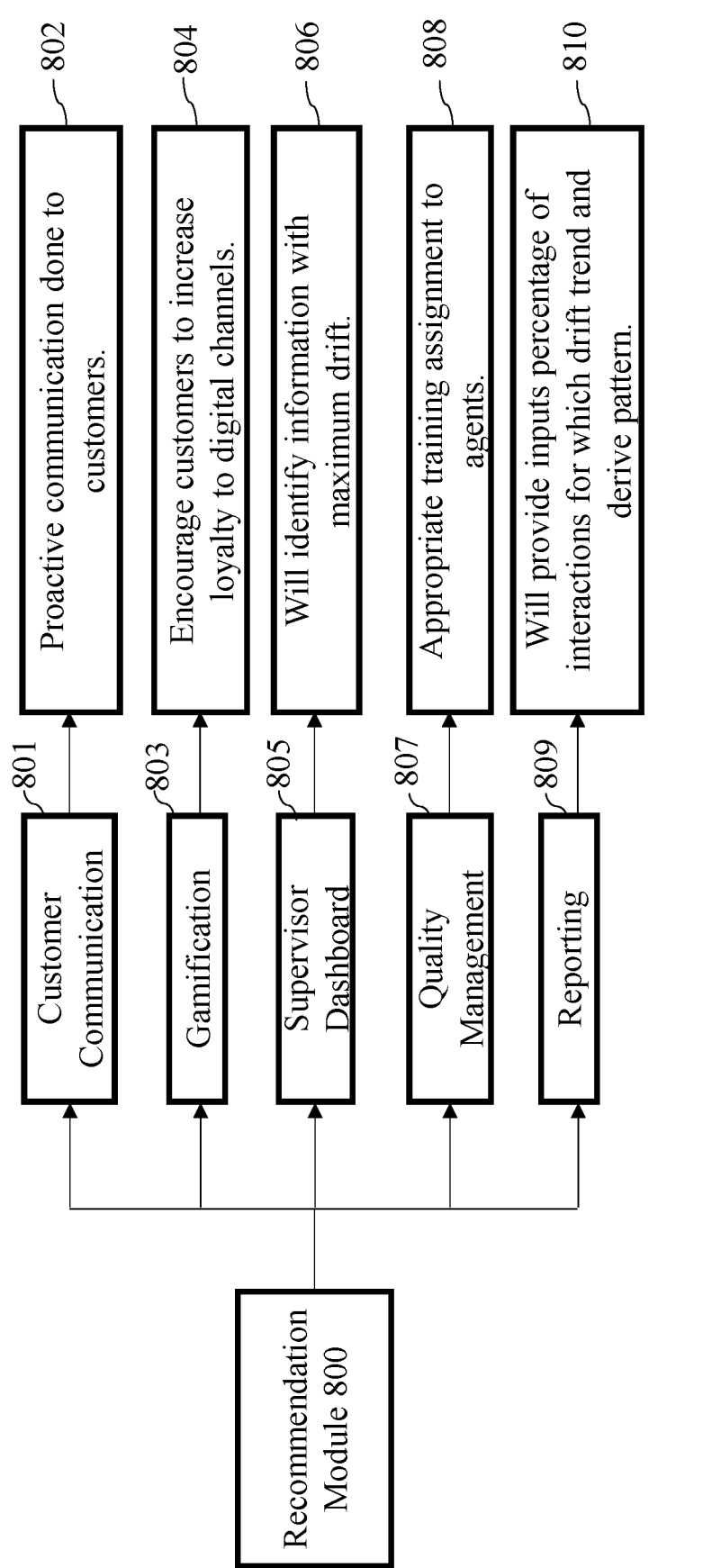
FIG. 8 depicts a dataflow diagram of a recommendation module for managing interactions between an agent device and a customer device, according to some embodiments of the present invention.

FIG. 8 depicts a dataflow diagram of a recommendation module 800 for managing interactions between an agent device and a customer device. Based on a calculated DDQ value and feedback that has been received via the feedback notification module (such was feedback notification module 416), recommendation module 800 may generate recommendations to a contact center, e.g. contact center 400, how to improve its performance, e.g. how to convince customers that have transitioned from a first connection type to a second connection type to reconnect to a first connection type, e.g. resume an interaction using a digital channel, e.g. a text chat.

Recommendation module 800 may provide remedial measures to a contact center, e.g. to a customer dashboard 801, a gamification module 803, a supervisor dashboard 805, quality management module 807 or a reporting module 809, based on calculated DDQs and evaluation carried out at the feedback notification module.

For example, recommendation module 800 may provide suggestion 802 to customer communication module 801 to proactively communicate to a customer.

For example, recommendation module 800 may provide suggestion 804 to gamification module 803 to encourage customers to increase loyalty to digital channels.

For example, recommendation module 800 may provide suggestion 806 to supervisor dashboard module 805 to identify information concerning a customer that shows the highest drift.

For example, recommendation module 800 may provide suggestion 808 to quality management module 807 to assign an appropriate training for an agent.

For example, recommendation module 800 may provide suggestion 810 to reporting module 809 to submit input percentages of interactions for a specific drift trend and drift pattern.

In an example, recommendation module 800 may retrieve interaction data suggesting that 80% of customers that have interacted with a specific agent are drifting. Alternatively, a trend may be automatically identified in the drift pattern, e.g. customers that contact a contact center at a specific time period during a day may not be able to start an interaction with an agent, e.g. because an agent who can interact with a customer in a specific language is not available. Recommendation module 800 may identify trends and drift patterns and may automatically identify remedial measures, e.g. redrafting the work schedule of agents for a digital channel of a contact center.

For a customer that shows a high DDQ value, e.g. a DDQ value above the threshold value, customer identification module 418 as shown on FIG. 4 may send a notification to the routing system indicating that a customer shows a high risk of transition from a first connection type to a second connection type.

Notifications indicating that a customer shows a high risk of transition from a first connection type to a second connection type may also be sent to a contact center manager of a contact center 400 for customers with high DDQ score.

Accordingly, for customers that show a risk of transitioning from a first connection type to a second connection type, at the beginning of an interaction, a communication will be sent to an agent that has been assigned to the interaction alerting the agent of a potential risk of transition for a customer.

For example, a notification to an agent prior to an interaction with a customer may read: "Dear Agent. customer is potential digital drift risk candidate. Please ensure strict feedback mechanism to customer and query resolution SLA is adhered."

Figure 9:
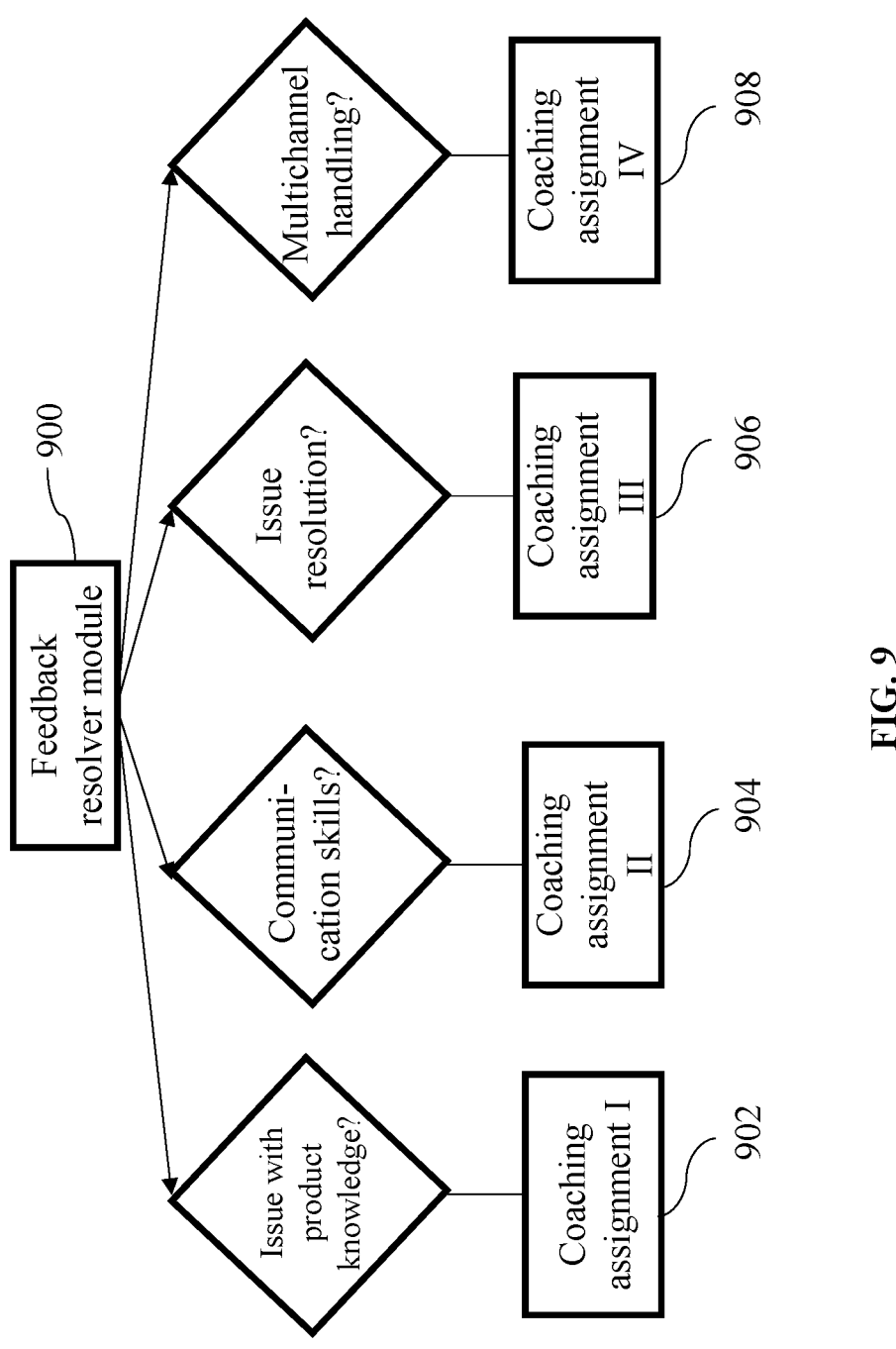
FIG. 9 depicts a dataflow diagram of a feedback resolver module for managing interactions between an agent device and a customer device, according to some embodiments of the present invention.

FIG. 9 depicts a dataflow diagram of a feedback resolver module 900 for managing interactions between an agent device and a customer device.

In case that customer may have elevated a call from a digital channel, e.g. a text chat, to a traditional channel, e.g. a voice connection, of a contact center, feedback that has been received by the feedback notification module may be used as input by the quality management system for evaluation.

Feedback resolver module 900 (or 415 as shown in FIG. 4) may analyze feedback that has been received from a customer, e.g. customer 406, in response to a feedback request that was previously sent to a customer via feedback notification module 416 or 600. Customer feedback that may be retrieved at the feedback notification module 416 may be sent to feedback resolver module 900 or 415 to identify problems in the interaction between an agent and a customer and, for example to offer remedial measures to an agent, a customer or to an agent and a customer. For example, feedback resolver module 900 or 415 may analyze feedback on an interaction from a customer using natural language processing. In response to an identified problem during the interaction, e.g. an agent lacking knowledge on a question asked by a customer, feedback resolver module 900 or 415 may automatically assign coaching sessions to an agent to improve the behavior of the agent in subsequent customer agent interactions.

If feedback resolver module 900 has identified an issue in the agent-customer interaction that relates to the lack of product knowledge by an agent, an agent may be allocated a training session to improve their product knowledge, e.g. by being assigned to coaching agreement I 902. If feedback resolver module has identified an issue in the agent-customer interaction that relates to the lack of communication skills by an agent, an agent may be allocated a training session to improve their communication skills, e.g. by being assigned to coaching agreement II 904. If feedback resolver module has identified an issue in the agent-customer interaction that relates to how an agent resolves an issue, an agent may be allocated a training session to improve their resolution competencies, e.g. by being assigned to coaching agreement III 906. If feedback resolver module has identified an issue in the agent-customer interaction that relates to the lack of multichannel handling skills by an agent, an agent may be allocated a training session to improve their multichannel handling skills, e.g. by being assigned to coaching agreement IV 908. For example, in cases where a delay in a response to a customer query received via a digital channel (e.g. a web chat) has been identified, a delay in the response may be identified as resulting from an agent multitasking and handling several interactions at the same time leading to delay in responding to a customer. In such a scenario, feedback resolver module 900 may recommend for example to the workforce management to carry out an optimization of all agent schedules.

In addition to customer feedback, feedback resolver module 900 may evaluate a DDQ rating for an agent, e.g. an agent using computing device 210, that may indicate whether an agent is skilled or whether an agent should attend a training module.

Figure 10:
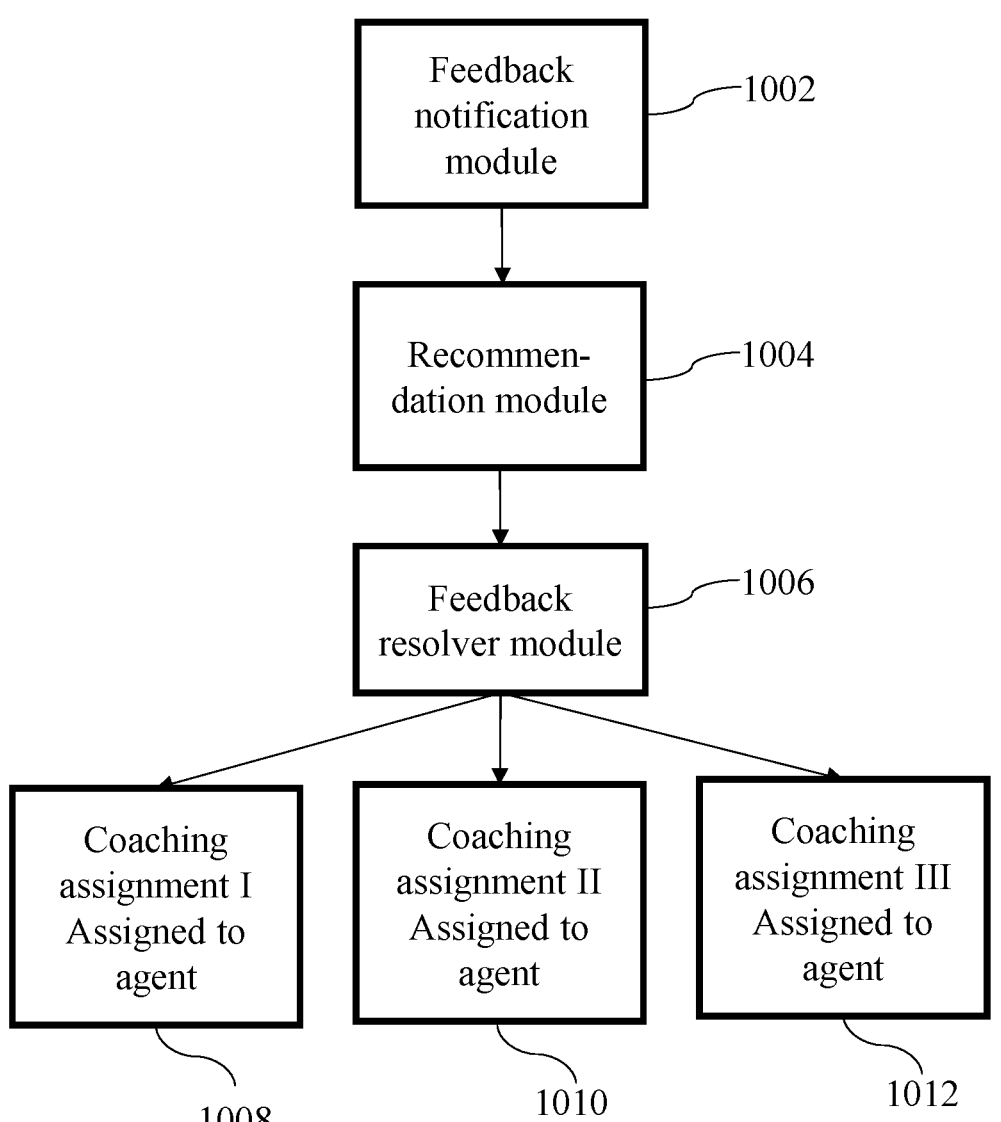
FIG. 10 depicts a scheme for the selection and initiation of one or more remedial measures, according to some embodiments of the present invention.

FIG. 10 depicts a scheme for the selection and initiation of one or more remedial measures. Feedback resolver module 1006 may receive recommendations to solve issues in a customer-agent interaction based on requests for feedback that may have been sent to a customer device of a customer, e.g. customer device 408 of customer 406, via feedback notification module 1002. Customer feedback sent from feedback notification module 1002 to recommendation module 1004 may be processed, e.g. using natural language processing, to identify issues raised by a customer. Issues raised by a customer, e.g. in a feedback form may be mapped to an agent that was present in the customer-agent interaction to assign tailored training modules 1008, 1010 or 1012 to an agent based on the received feedback.

For example, in case when customer feedback for an agent was received that suggested that an agent had issues answering queries to a new product, the agent may be assigned a training module, e.g. training module 1008 "answering sales queries". For example, in case when customer feedback for an agent was received that suggested that an agent lacked confidence in suggesting a solution to a customer issue, the agent will be assigned training module 1010 "making effective recommendations". For example, in case when customer feedback for an agent was received that suggested that an agent lacked the ability to communicate parallel in multiple chat channels, the agent will be assigned training module 1012 "using multiple channels effectively".

Figure 11:
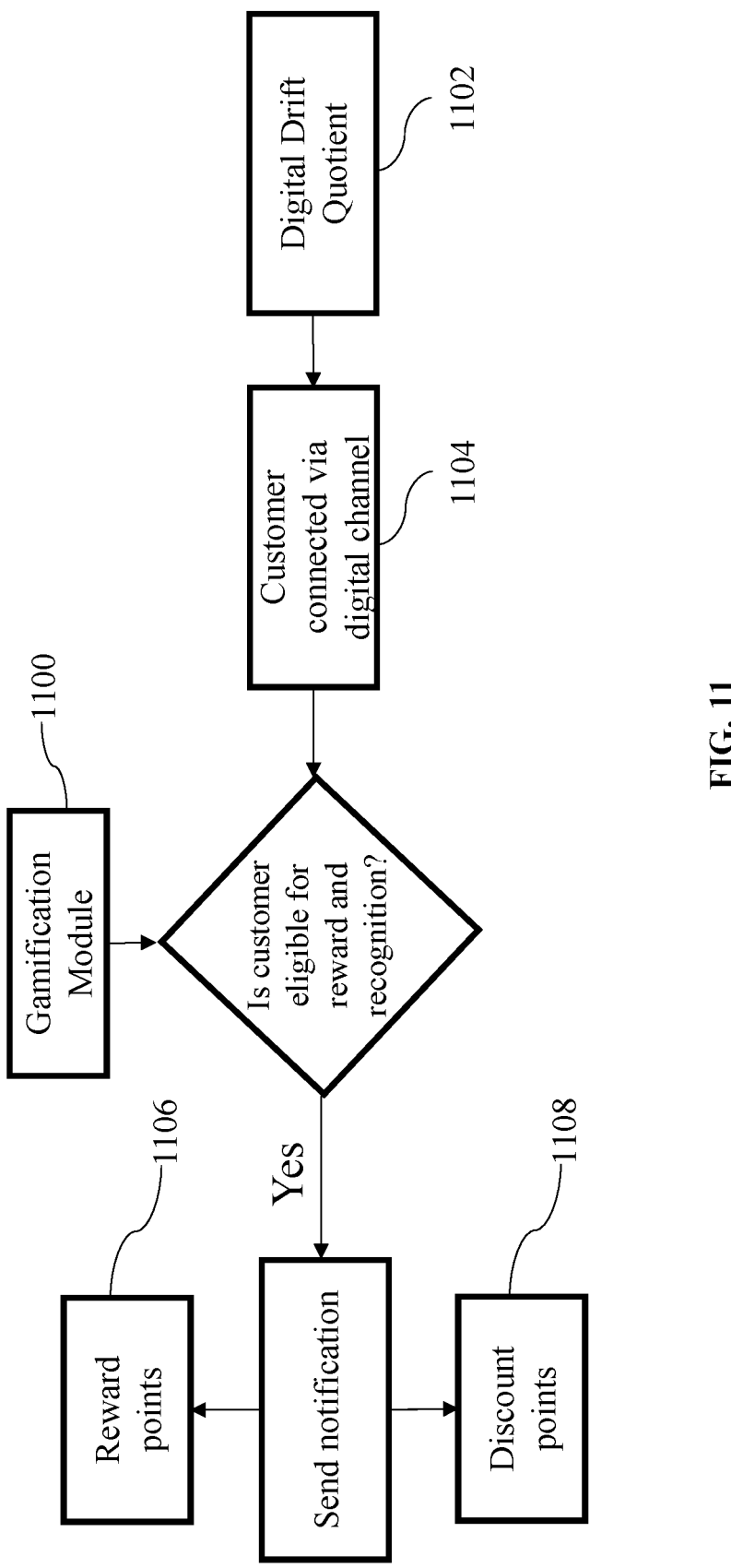
FIG. 11 depicts a data flow diagram of a gamification module for the selection of one or more remedial measures, according to some embodiments of the present invention.

FIG. 11 depicts a data flow diagram of a gamification module 1100 for the selection of one or more remedial measures, e.g. by recommendation module 900. Gamification module 1100 may include remedial measures that may be offered to customers that have transitioned from a first connection type to a second connection type or that have used a first connection type, e.g. a digital connection type for a certain period of time, e.g. a year. For example, customers that may be offered a remedial measure via gamification module 1100 may be identified by their DDQ 1102 being above a threshold. Alternatively, customers that may be offered a remedial measure via gamification module 1100 may be identified by using a first connection type for a long period, e.g. a digital channel 1104. If a customer is eligible for a reward or recognition by fulfilling either of the mentioned conditions, reward points 1106 or discount points 1108 may be offered to the customer to either provide an incentive to reconnect to an interaction via a first connection type or to continue joining an interaction via a first connection type. FIG. 11 may include metrics for reward points 1106 and discount points 1108 for a specific customer, e.g. customer 406.

Figure 12:
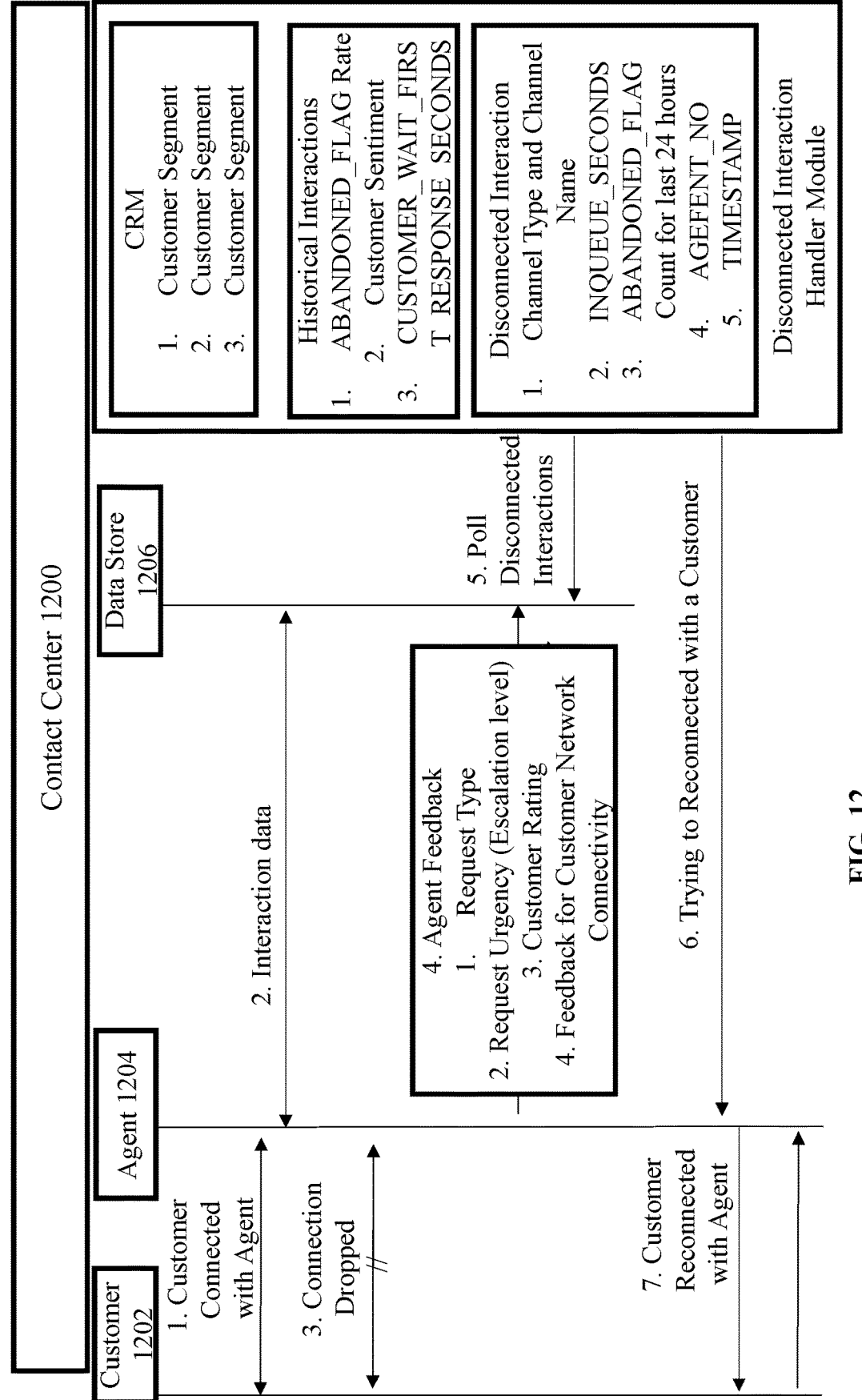
FIG. 12 depicts a scheme for the interactions between customer and agent mediated by a contact center and a data store of the contact center, according to some embodiments of the present invention.

FIG. 12 depicts data flow information for the interactions between customer 1202 and agent 1204 mediated by a contact center 1200 and a data store 1206 located within contact center 1200.

In step 1, a customer 1202 may be connected to an agent, e.g. in an interaction via a digital channel such as a text chat.

In step 2, interaction data may be transferred from a computing device of agent 1202, e.g. computing device 210 to a data store 1206 or a contact center database 402 as shown in FIG. 4.

In step 3, a connection between an agent 1204 and a customer 1202 may be interrupted, e.g. because customer 1202 experienced a problem using a first connection type, e.g. a digital channel.

In step 4, feedback requests and interaction ratings are sent to a customer 1202 and an urgency indication for a reconnection to an agent is generated by contact center 1200. Received feedback and interaction ratings for a customer 1202 are stored, e.g. in data store 1206.

In step 5, an agent 1204 may attempt to reconnect to a customer 1202 using a digital channel.

In step 6, agent 1204 may attempt a reconnect of an interaction to customer 1202.

In step 7, agent 1204 may be reconnected to customer 1202 and can resume an interaction using a digital channel.

Figure 13:
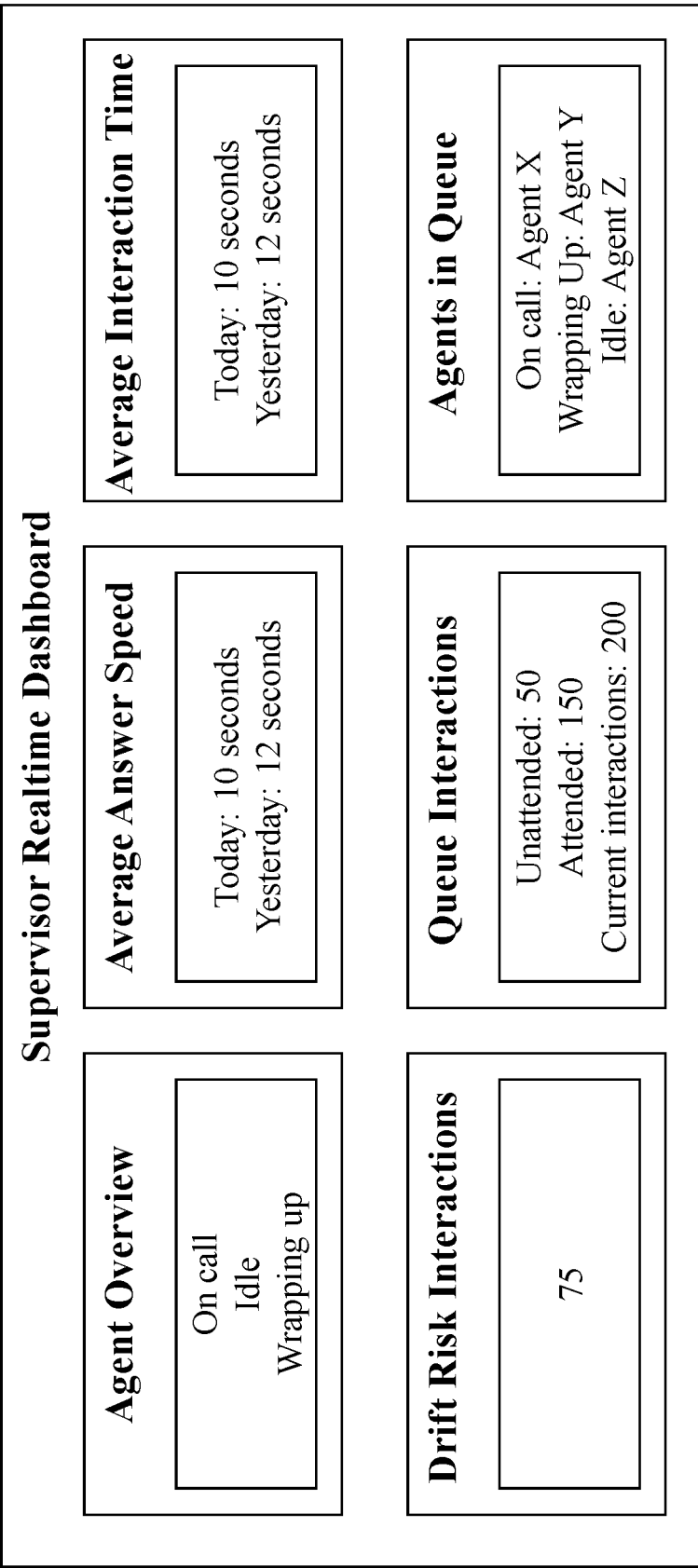
FIG. 13 depicts an example layout for a supervisor dashboard to view customer interactions and their associated risk to transition from a first connection type to a second connection type, according to some embodiments of the present invention.

FIG. 13 depicts an example layout for a supervisor dashboard to view customer interactions and their associated risk to transition from a first connection type to a second connection type.

A supervisor dashboard for a contact center 400 may comprise an agent overview detailing the number of agents in a call being idle or wrapping up. A supervisor dashboard may include an average answer speed for the present day and previous dates. A supervisor dashboard may include an average interaction time for an agent customer interaction for the present day and previous dates. A supervisor dashboard may include an average transition risk from a first connection type to a second type that is a mean value for all ongoing interactions. A supervisor dashboard may include the number of unattended, attended and total number of interactions. A supervisor dashboard may include a status for all agents of a contact center that are in a queue.

Example: Test Environment for Identifying Transitions from a First Connection Type to a Second Connection Type In a test environment, a data set of 7610 interaction has been used and analyzed in the identification of changes from a first connection type to a second connection type between the agent device and the customer device.

The test environment may be considered as a uniform schema and comparable to Real World Production data.

Based on the dataset of interactions, factors such as:
a. Customer digital and traditional channels usage over time to calculate DUS
b. Sentiment score to calculate ISS
c. Customer category to calculate CCS d. Interaction abandoned flag to calculate ARS
e. Interaction transferred flag to calculate TRS
were calculated.

Based on the calculated DUS, ISS, CCS, ARS and TRS factors, digital drift quotients (DDQs) were calculated for the corresponding customers that were part in the analyzed interactions.

Calculated DDQs indicated whether a customer was identified to drift towards a traditional channel or was not drifting towards a traditional channel.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of managing interactions between agent devices and customer devices, wherein the method comprises:

identifying, by natural language processing, interaction data in interactions between an agent device and a customer device that show a transition from a first connection type to a second connection type; and when a transition in connection types initiated by the customer device is identified, initiating one or more remedial measures, the remedial measures being different from the transition in connection types, and wherein the remedial measures is amending the agent's workload.

2. A method of managing interactions according to claim 1, wherein the transition in connection types between the agent device and the customer device is a transition from a visual connection type to an audio connection type.

3. A method of managing interactions according to claim 1, wherein the remedial measures are selected from the group consisting of:

alerting a contact center of the transition from the first connection type to the second connection type;

notifying the customer device of the transition in connection type from the first connection type to the second connection type;

requesting feedback from the customer device on the transition from the first connection type to the second connection type;

classifying the customer device as having transitioned from the first connection type to the second connection type for subsequent interactions; and providing rewards for customers to reconnect via the first connection type; and assigning interaction training modules to agents.

4. A method of managing interactions according to claim 3, wherein notifying the customer device of the transition in connection types comprises informing the customer device of the availability of the first connection type.

5. A method of managing interactions according to claim 3, wherein alerting the contact center comprises sending the agent device during the transition from the first connection type to the second connection type a notification that the customer device is changing the connection type.

6. A method of managing interactions according to claim 1, wherein the transition from the first connection type to the second connection type is identified by interaction data in interactions selected from a group consisting of: customer sentiments, customer usage trend, transfer rate, abandonment rate, customer category, customer grievance rate, agent utilization.

7. A method of managing interactions according to claim 1, wherein interaction data is identified in real-time.

8. A method of managing interactions according to claim 1, wherein interaction data is identified prior to the transition from the first connection type to the second connection type.

9. A method of managing interactions according to claim 1, wherein when interaction data shows a transition from the first connection type to the second connection type, the agent device is assigned a training module.

10. A method of managing interactions according to claim 1, wherein the identification of interaction data showing a transition from the first connection type to the second connection type is further identified by an identification procedure selected from the group consisting of: key word detection, and detection of abandoned interactions.

11. A system for managing interactions between agent devices and customer devices, the system comprising:

a computing device;

a memory; and a processor, the processor configured to:

identify, via natural language processing, interaction data in interactions between an agent device and a customer device that show a transition from a first connection type to a second connection type and wherein the remedial measures is amending the agent's workload; and when a transition in connection types initiated by the customer device is identified, initiating one or more remedial measures, the remedial measures being different from the transition in connection types.

12. A system for managing interactions according to claim 11, wherein the transition in connection types between the agent device and the customer device is a transition from a visual connection type to an audio connection type.

13. A system for managing interactions according to claim 11, wherein the remedial measures are selected from the group consisting of:

alerting a contact center of the transition from the first connection type to the second connection type;

notifying the customer device of the transition in connection type from the first connection type to the second connection type;

requesting feedback from the customer device on the transition from the first connection type to the second connection type; and classifying the customer device as having transitioned from the first connection type to the second connection type for subsequent interactions.

14. A system for managing interactions according to claim 13, wherein notifying the customer device of the transition in connection types comprises informing the customer device of the availability of the first connection type.

15. A system for managing interactions according to claim 13, wherein alerting the contact center comprises sending the agent device during the transition from the first connection type to the second connection type a notification that the customer device is changing the connection type.

16. A system for managing interactions according to claim 11, wherein the transition from the first connection type to the second connection type is identified by interaction data in interactions selected from a group consisting of: customer sentiments, customer usage trend, transfer rate, abandonment rate, customer category, customer grievance rate, agent utilization.

17. A system for managing interactions according to claim 11, wherein interaction data is identified in real-time.

18. A system for managing interactions according to claim 11, wherein when interaction data shows a transition from the first connection type to the second connection type, the agent device is assigned a training module.

19. A system for managing interactions according to claim 11, the identification of interaction data showing a transition from the first connection type to the second connection type is further identified by an identification procedure selected from the group consisting of: key word detection, and detection of abandoned interactions.

20. A method of monitoring conversations between agent devices and customer devices, wherein the method comprises:

monitoring conversation data in conversations between an agent device and a customer device to identify, via natural language processing, data that shows a switch from a first communication type to a second communication type between the agent device and the customer device; and when a switch in communication types between the agent device and the customer device initiated by the customer device is identified, initiating one or more remedial measures, the remedial measures being different from the switch in communication types, and wherein the remedial measures is the agent's workload.

\* \* \* \* \*